SIGNAL TUNED RADIO CONTROL

Filed Nov. 6, 1952 2 Sheets-Sheet 1

Inventor
James H. Guyton
By Willits, Helwig & Baillio
Attorneys

Inventor
James H. Guyton
By Willits, Helwig & Baillio
Attorneys

United States Patent Office 2,861,178

Patented Nov. 18, 1958

2,861,178

SIGNAL TUNED RADIO CONTROL

James H. Guyton, Kokomo, Ind., assignor to General Motors Corporation, Detroit, Mich., a corporation of Delaware Application November 6, 1952, Serial No. 319,014

4 Claims. (Cl. 250—20)

This invention relates to control means for receiving means for electrical wave radiation and more particularly to radio frequency receiving means indexed or tuned to a given position by the appearance of an incoming signal. Various types of systems have been devised for stopping or indexing receiving means for radio frequency waves by the arrival of incoming wave signals. These have been referred to as "signal seeking" or "signal tuned" receivers. As examples of certain forms of such a control system, reference is made to my copending applications Serial No. 106,223, entitled "Signal Seeking Tuner," filed July 22, 1949, issued as Patent 2,652,486, September 15, 1953, and Serial No. 141,063, entitled "Signal Actuated Tuner Selective Over Noise Level," filed January 28, 1950. The control systems disclosed in these applications have been operated satisfactorily to stop or index a receiver on station accurately by the incoming signal. However, they require a substantial number of additional parts and equipment over and above a conventional radio frequency receiver tuned manually or by mechanically presettable means, and therefore result in a more expensive device.

It is therefore an object in making this invention to provide novel control means for automatically indexing the variable tuning means of a receiver of radio frequency waves by the use of an incoming signal.

It is a further object in making this invention to provide a simplified control system for signal tuning a receiver of high frequency waves.

It is another object in making this invention to provide a signal controlled variable tuning system for a receiver of high frequency modulated waves that will require only a limited number of additional parts more than a conventional high frequency receiver, and which will accurately index the variable tuning means to incoming stations within the frequency band of the receiver.

It is a still further object in making this invention to provide a signal controlled tuning system for a high frequency receiver which is controlled by an alternating current trigger voltage which is opposed by a variable direct current bias whose value is determined by the strength of the incoming signal.

With these and other objects in view which will become apparent as the specification proceeds, my invention will be best understood by reference to the following specification and claims and the illustrations in the accompanying drawings, in which:

Figure 1:
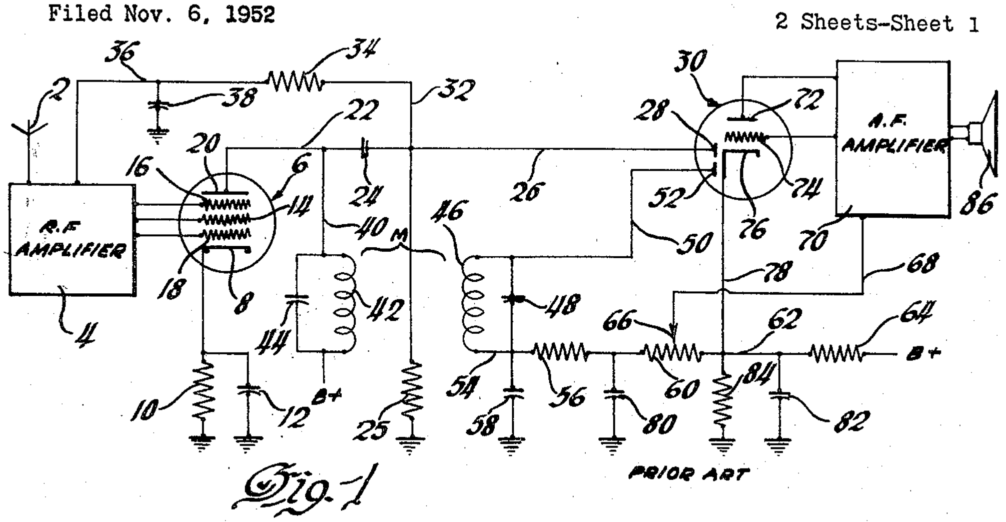
PRIOR ART Fig. 1
Figure 1 is a block circuit diagram of a conventional receiver of high frequency radiation showing in detail the last intermediate frequency coupling circuit and the detector circuit.

Referring now more particularly to the drawings, a conventional radio receiver is shown in Figure 1, consisting in the main of a high frequency or radio frequency amplifier which terminates in a last intermediate frequency stage feeding a detector, the output of which is then amplified by an audio frequency amplifier and applied to a loud speaker for audible response. In Figure 1 there is shown a receiving antenna 2 upon which incoming signals appear. The antenna 2 is connected to a radio frequency amplifier section indicated by the block 4 labelled "R. F. Amplifier." In a conventional superheterodyne receiver this section could include an R. F. amplifier stage, a converter-mixer stage tuning means and one or two intermediate frequency amplifier stages.

In Figure 1 the last intermediate frequency amplifier stage is shown in detail. This consists of a pentode tube 6, whose cathode 8 is connected to ground through resistor 10. Condenser 12 is connected in shunt to resistance 10. Control grid 18 of the tube is fed by the preceding stages in the R. F. amplifier and also the screen grid 14. The suppressor grid 16 of tube 6 is provided with the proper voltages from that portion shown at 4. Plate 20 of the tube 6 is connected through line 22 to one side of coupling condenser 24, the opposite terminal of which is connected to line 26. Line 26 is connected to diode-anode 28 in a duo-diode, triode tube 30. A resistance 25 is connected between line 26 and ground.

Tie line 32 extends between line 26 and one terminal of a resistor 34. Line 36 is connected to the opposite end of the resistor 34 and extends back to the R. F. amplifier 4. Condenser 38 is connected between line 36 and ground. This line 36 is known as the AVC line or automatic volume control in that it applies a negative D. C. voltage back to the R. F. amplifier to control the strength of the amplified signals. The resistance-capacitance 34—38 provides a time delay circuit for the AVC.

Line 40 connects line 22 to one side of the primary 42 of the intermediate frequency transformer. Condenser 44 connected across primary 42 provides a resonant circuit at the designed intermediate frequency. Secondary 46 of the intermediate frequency transformer is inductively coupled to the primary 42 as indicated by the bracket and M, and is tuned to the same desired intermediate frequency by condenser 48. One terminal of the secondary 46 is connected through line 50 to diode-anode 52 of the tube 30. The opposite terminal of the secondary 46 is connected through line 54 to resistance 56. Condenser 58 is connected between line 54 and ground. A variable tapped resistance 60 is connected in series with resistance 56 and has its remote terminal connected to line 62 which is in turn connected through a limiting resistor 64 to the voltage source indicated as B+. The adjustable tap 66 on resistor 60 is connected through line 68 to the audio frequency amplifier indicated by block 70, labelled "A. F. Amplifier." This adjustable tap 66 acts as the conventional manual volume control for the receiver. The triode section of the tube 30 acts as the first stage of the audio amplifier and has its plate 72 and grid 74 shown connected thereto. The cathode 76 of the tube 30 is connected to line 62 by tie line 78. Filter condensers 80 and 82 are connected respectively from a point intermediate the resistances 56 and 60 and from line 62 to ground. Resistor 84 is connected between line 62 and ground. The output of the audio frequency amplifier 70 is fed to the loud speaker 86.

This system is conventional and the signal appearing on the antenna is amplified by the R. F. amplifier and applied to the last I. F. coupling stage shown in detail from which it is applied to the diode 52—76 for detection and a proportionate part of the detected signal is applied to the A. F. amplifier, depending upon the setting of the potentiometer tap 66. The resultant amplified energy is then applied to the loud speaker and appears as an audible signal. The diode 28—76 develops the AVC voltage to be fed back to the R. F. amplifier in inverse phase to maintain the output substantially constant through the AVC time delay circuit 34—38. This voltage is developed only when the received signals are of such strength as to produce an R. F. peak voltage at plate 20 of tube 6 greater than the positive voltage of cathode 76. This AVC delay voltage is provided by the voltage divider action of resistors 64 and 84 in series from the B+ source of voltage.

In signal tuned systems the object is to provide means for stopping a scanning-tuning drive as accurately on signals tuned in as possible. The previously mentioned copending applications Serial No. 106,223 and Serial No. 141,063 disclose control systems in which the stopping signal is obtained from the last I. F. transformer, two signals being independently taken from the primary and secondary circuits thereof, both signals being rectified and connected in opposed relation to produce a very sharp and accurate stopping pulse. However, the component parts used for this stopping signal generation are required to be held to closer tolerances than are often necessary in conventional radio construction, which increases the price and requires more care in tests and assembly.

Figure 2:
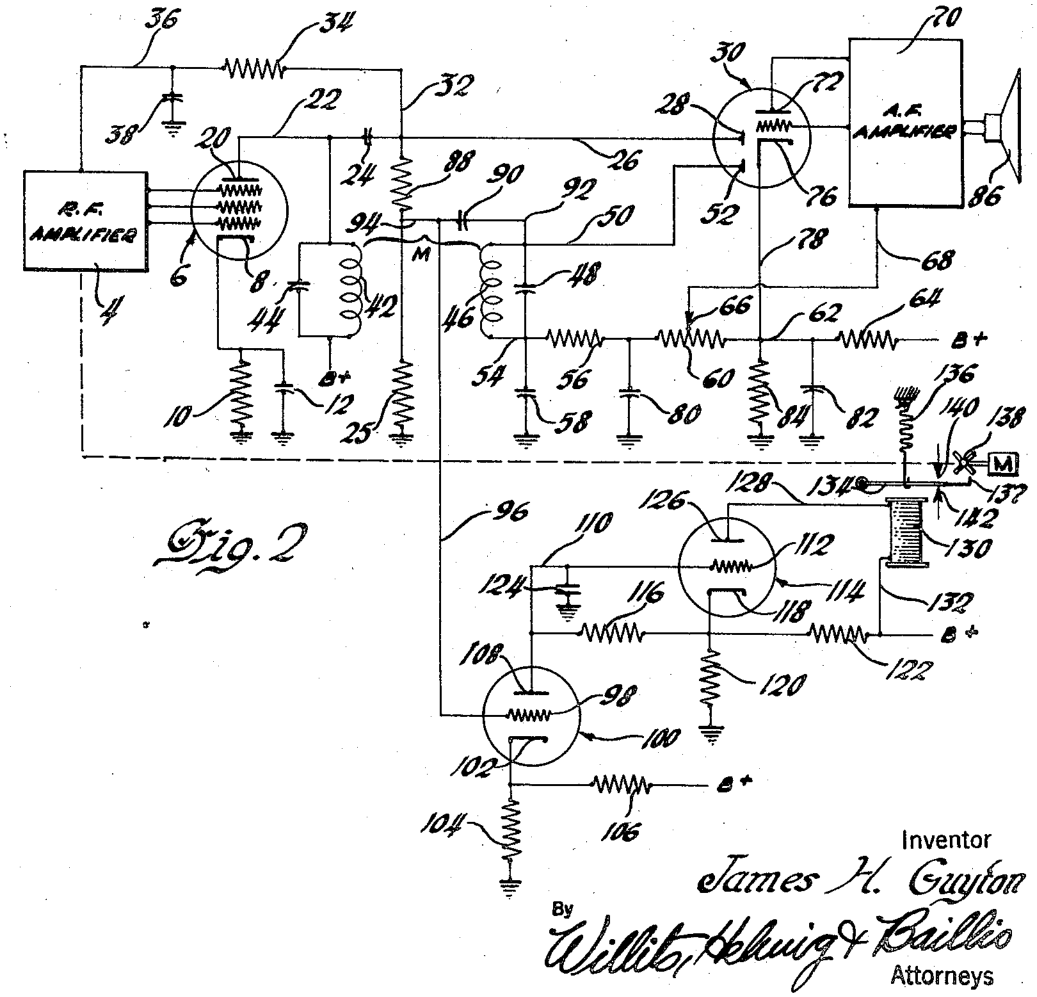
Figure 2 is a similar block circuit diagram including a signal actuated indexing control circuit embodying my invention.

The present system simplifies the previous controls considerably and attention is now directed to Figure 2, in which like parts appearing in Figure 1 are indicated by the same reference characters. It will be obvious that the last intermediate frequency transformer 42—46 is, as before, fed by the output of tube 6 and in turn impresses a detectable signal on diode 52—76. The detected signal is then proportionately applied to the A. F. amplifier 70 through the adjustable tap 66 on resistor 60. However, between line 26 to which the AVC control circuit is connected and resistor 25 there has been added a further resistance 88 in series with resistor 25. Line 92 is connected between line 50 and one side of a coupling condenser 90. Line 94 connects the opposite terminal of the coupling condenser 90 to an intermediate point between resistors 88 and 25. Line 96 extends between line 94 and control grid 98 of a triode 100. The triggering pulse for controlling the indexing of the signal tuning drive is applied through line 96 to control grid 98. Cathode 102 of the triode 100 is connected to ground through biasing resistor 104 and to the source of power indicated as B+ through dropping resistor 106.

The plate 108 of the tube 100 is connected through conductive line 110 to control grid 112 of a second triode 114, connected in cascade relation to the first. A resistor 116 is connected between line 110 and cathode 118 of the second triode 114. Cathode 118 is likewise connected to ground through biasing resistor 120 and to the source of power indicated as B+ through dropping resistor 122. Condenser 124 is connected between line 110 and ground. Plate 126 of the second triode 114 is connected through conductive line 128 to one terminal of a control relay coil 130, the opposite terminal of said coil being connected through line 132 to power source B+. The movable armature 134 of the control relay is moved by the energization of said relay coil in opposition to the force of a biasing spring 136, said armature 134 having an extending tip 137 to engage and mechanically lock against rotation a rotating member 138 on the driving means for the tuner to keep it from movement when in tuned position. Armature 134 likewise oscillates between two stationary contacts 140 and 142 for controlling other portions of the apparatus electrically.

In brief, the operation of this system may be described as one in which the triggering voltage is supplied from an A. C. high frequency source. When the system is tuning and driving means is causing the tuner to scan the band, relay coil 130 will be energized to hold its armature 134 in a downward position, as shown in Figure 2, so that the tip of the armature will be out of physical engagement with the rotating member 138 thereof and the tuner may move. At this time tube 114 will, therefore, be conducting and the relay coil 130 will be in series with the conductive path through said tube. At this same time tube 100 will be non-conductive, since its grid 98 and cathode are so biased by the voltage drop across resistor 104 that during this portion of the operating cycle it will conduct no current, thus permitting the grid 112 of the second tube 114 to maintain a sufficiently positive voltage to continue conduction through that tube.

In order, therefore, to stop the tuning means on a station, it is necessary to produce a sufficient positive voltage at grid 98 to cause conduction in the system of tube 100 of sufficient value to drive grid 112 in a negative direction to cut off the flow through that tube and cause relay coil 130 to release its armature 134 and thus stop the tuning means from movement. This is accomplished by using one A. C. control voltage and a varying D. C. bias therefor. The A. C. voltage is supplied to the grid of the tube 100 directly through coupling condenser 90 from the secondary 46 of the intermediate frequency transformer 42—46. This circuit may be traced as follows: from the secondary 46, line 92, coupling condenser 90, line 96, control grid 98, and through condenser 58 to ground, and thence through resistor 104 to cathode 102 of tube 100. Tube 100 is biased past cutoff by the voltage drop across the cathode resistor 104 which is connected to the B+ source through resistor 106. In the absence of any signal, therefore, tube 100 does not conduct and condenser 124 is charged from the B+ source of voltage through resistors 116 and 122.

On weak signals which are not strong enough to produce AVC rectification at diode 28—76, but which are strong enough to drive the grid 98 on positive peaks of the A. C. in the I. F. secondary 46 into the plate current conductive region, tube 100 will alternately conduct and become non-conductive at the R. F. frequency of supply. During the conductive portions condenser 124 will discharge therethrough, and during the non-conductive portions it will charge through resistors 116 and 122. The net result is that as this high frequency alternating current causes the voltage on the grid 98 to fluctuate, some average value of plate current flows through resistors 116 and 122, which produces a triggering voltage at the grid 112, lowering the potential thereof to a point where conductivity through tube 114 will be reduced, releasing armature 134 to stop the tuning. The point in the frequency spectrum at which the voltage appears is a function of the selectivity of the set and of the delay bias on the tube 100. However, with weak signals an entirely satisfactory stopping signal can be obtained in this manner.

As the signals which may be tuned in during tuning become stronger, however, the triggering signal just described as appearing in the grid circuit 112 would appear further and further ahead of the peak of the secondary resonance curve, and unless a compensating effect is introduced, the tuner would stop prematurely. In order to provide this action and to maintain the actuating pulse at the proper location with respect to peak resonance, an additional D. C. biasing voltage is obtained on strong signals from the AVC diode 28—76, the result of which is added to the cathode bias provided by resistance 104 in tube 100. Resistances 106 and 25 may be so proportioned that the triggering voltage appearing on the grid circuit may be made to appear at substantially the same frequency, regardless of signal strength. The biasing D. C. voltage appearing across resistor 25, which is generated by the stronger signals when the automatic volume control portion of the receiver comes into use, will appear as a station is tuned in before the radio frequency voltage appearing on line 96 would cause sufficient conductance through tube 100 and will be of sufficient value to prevent plate conduction of this latter tube except in that region very near resonance.

Figure 3:
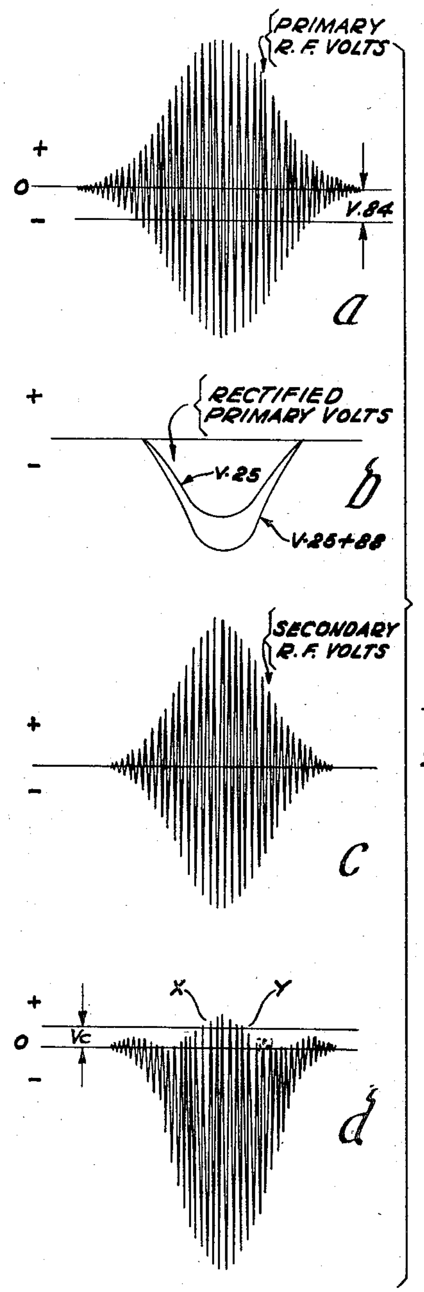
Figure 3 is a series of graphical wave forms showing the control waves present at different points in the circuit and the resultant combinations.

In order to better understand the action of the delaying voltage, reference is now made to the graphs shown in Figure 3. In that case the top graph labelled "*a*" shows the primary radio frequency volts appearing on a frequency base. The high frequency voltage, of course, increases to a maximum at resonance and then dies away as the signal is passed. It is uniform on both sides of a zero reference axis and the parallel line below the zero axis indicated as V–84 represents the D. C. bias appearing across resistance 84 of the diode. As soon, however, as the signal reaches such strength as to overcome the bias V–84, then current flows in the AVC control system to develop voltages across resistors 88 and 25 of a negative value. Graph "*b*" of Figure 3 indicates the negative voltages appearing across resistor 25 alone or across resistors 25 and 88 in series, the two curves being labelled respectively "V–25" and "V–25+88." The third graph "*c*" shown in descending order in Figure 3 indicates the secondary R. F. volts whose form again is determined by the selectivity and construction of the I. F. transformer. This, of course, is the voltage directly applied to the grid 98 of the tube 100 through coupling condenser 90.

However, since line 96 is also connected through line 94 to the biasing resistors 88—25, this additional D. C. negative bias provided by the AVC control, when added to the secondary R. F. volts, provides a resultant curve or graph as shown at "*d*" of Figure 3. It will be obvious from that figure that the major part of the resultant curve is negative or below the zero axis, and only a small portion of the curve projects in the positive direction. If there now is drawn across parallel to the zero axis a line indicating the bias voltage at which tube 100 begins to conduct, indicated as $V_c$, that portion of the resultant curve which projects above that biasing line, indicated as that portion between X and Y, will be that portion only which is capable of providing triggering voltages to the tube 100, which will alternately charge and discharge condenser 124 and permit tube 114 to cease conducting and stop the tuning means for the receiver. It will thus be obvious that when the incoming signal is weak, only the peaks of the secondary volts over and above the bias provided by resistor 104 will create enough current to stop the receiver, and as the incoming signal strength increases, the AVC will provide stronger and stronger negative bias through the voltage across resistor 25, so that the width of the alternating current peak providing stopping signals remains relatively narrow and the indexing produced thereby very accurate.

Figure 4:
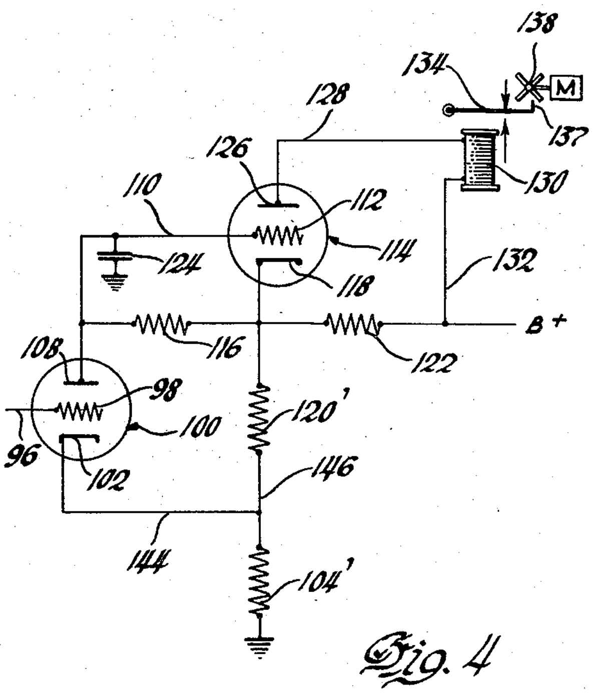
Figure 4 is a circuit diagram of a portion of a modified control system showing the control tubes for the relay.

Figure 4 shows a modification in the connections between tubes 100 and 114. In that instance the control grid 98 is, of course, still supplied by control voltage through line 96, and plate 108 of the tube is connected through line 110 to control grid 112 of the tube 114. Condenser 124 is connected between line 110 and ground. Plate 126 of the tube 114 is, as previously, connected through line 128 to relay coil 130 and the opposite terminal of the latter through line 132 to the high voltage power supply B+. Resistors 116 and 122 are, as previously, connected in series between the source of power B+ and line 110 and their intermediate point is connected to cathode 118 of the tube 114. In this instance, however, cathode 102 of the first triode tube 100 is connected through line 144 to tie line 146 between cathode biasing resistors 120' and 104'. The opposite terminal of resistor 104' is grounded and the opposite terminal of resistor 120' is directly connected to cathode 118. Thus the bias for cathode 118 is developed across the two resistors 104' and 120' in series, whereas the bias for the cathode 102 is developed across the resistance 104'. In this case the initial bias for cathode 102 is determined by the voltage drop across 104' and this voltage is produced both by current from B+ through resistor 122 and by current from B+ through relay 130 and tube 114. Any triggering voltage appearing at grid 96 which is sufficient to reduce the relay current, also reduces the bias on cathode 102, which causes further conduction in tube 100. The circuit is thus regenerative and a fast snap action to the relay is obtained. Relay coil 130 is still energized during tuning operations to attract its armature 134 and move the tip 137 thereof out of engagement with the rotating part 138, and upon the appearance of a signal deenergize relay coil 130 to quickly stop the tuning drive and cause indexing accurately on station.

I claim:

1. In control means for radio receiving apparatus having high frequency amplifying and coupling means, an automatic volume control circuit and variable tuning means for tuning the receiver over a predetermined band of frequency; driving means connected to the tuning means for driving the same, relay means controlling the driving means, a first multi-element tube connected to the relay to control the same, a control grid for said tube, a source of power, a resistor connected to said source and to the grid to apply a bias voltage thereto, a second multi-element tube having a grid, plate and cathode, conductive means connecting the plate of the second tube to the grid of the first, a condenser connected between the conductive means and ground, means applying an alternating current signal from the high frequency coupling means to the grid of the second tube to produce alternate periods of conduction and non-conduction in said tube at the frequency of the applied current to alternately discharge the condenser and allow it to charge through the resistance, creating an alternating current in the grid circuit of the first tube and lowering the biasing voltage to cut off the first tube and control the driving means, tapped resistor means connected to the automatic volume control circuit and to ground to develop a bias variable proportionately with signal strength, means connecting a tapped point in the last-named resistor means to the control grid of the second tube in a negative sense to oppose the generation of positive waves by the alternating current, cathode biasing means for the second tube so that no current will flow through the plate cricuit of the second tube unless the amplitude of the alternating current waves is sufficient to overcome the bias and delay biasing means connected to said automatic volume control circuit to prevent any restraining action until the signal exceeds a certain strength.

2. In control means for radio receiving apparatus having high frequency amplifying and coupling means, an automatic volume control circuit and variable tuning means for tuning the receiver over a predetermined band of frequency, driving means connected to the tuning means for driving the same, relay means controlling the driving means, a first multi-element electron tube having a cathode, plate and grid whose plate is connected to said relay means to control the same, a source of power, a resistor connected to said source and to the grid to apply a bias voltage thereto, a second multi-element electron tube having a cathode, grid and plate, conductive means connecting the plate of the second tube to the grid of the first, capacitance means connected between the conductive means and ground, resistance means connected to the source of power and between the cathode of the first tube and ground to apply a bias to said tube, and conductive means connecting the cathode of the second tube to an intermediate point in the resistance means to provide a cathode bias for the second tube so that current flow through the first-named tube will alter the bias on the second.

3. In control means for radio receiving apparatus having high frequency amplifying and coupling means, an automatic volume control circuit and variable tuning means for tuning the receiver over a predetermined band of frequency, driving means connected to the tuning means for driving the same, relay means controlling the driving means, a first multi-element electron tube having a cathode, plate and grid whose plate is connected to said relay means to control the same, a source of power, a resistor connected to said source and to the grid to apply a bias voltage thereto, a second multi-element electron tube having a cathode, grid and plate, conductive means connecting the plate of the second tube to the grid of the first, a condenser connected between the conductive means and ground, means applying an alternating current signal from the high frequency coupling means to the grid of the second tube to produce alternate periods of conduction and non-conduction in said tube at the frequency of the applied current to alternately discharge the condenser and allow it to charge through the resistance, and resistance biasing means for the cathodes of both tubes, a portion of which is common, so that flow through one tube will affect the bias on the other to provide a quick-acting system.

4. In a high frequency electric wave receiving means having variable tuning means to tune the same over a predetermined band of frequencies, means connected to the tuning means to drive the tuning means, a control system comprising indexing means acting on the driving means to stop the same, electronic means connected to the indexing means to determine the energization thereof, control means for the electronic means including resistance means connected in circuit with the control means, capacitance means connected in series with and controlling the flow of current through the resistance means to vary the potential drop across the same, tuned high frequency coupling means in the receiving means, biased rectifying conductive means connecting the tuned high frequency coupling means to the capacitance means to establish high frequency pulses on said capacitance if their amplitude approaches the bias to vary the control voltage on the resistance means, rectifying means connected to the tuned high frequency coupling means, voltage dividing means connected to said rectifying means across which a restraining voltage is developed as the signal strength increases to automatically control the volume of the system, a connection from an intermediate point in the voltage divider to the biased rectifying conductive means to apply a proportionate part of the restraining voltage thereto and oppose conduction to secure accurate indexing, and fixed biasing means on said rectifying means to delay rectifying action until the incoming signal exceeds a given value.

References Cited in the file of this patent

UNITED STATES PATENTS

| | | |
|---|---|---|
| 2,056,200 | Lowell | Oct. 6, 1936 |
| 2,326,737 | Andrews | Aug. 17, 1943 |
| 2,541,017 | Alexander | Feb. 13, 1951 |
| 2,550,430 | Schwarz et al. | Apr. 24, 1951 |
| 2,584,578 | Gull | Feb. 5, 1952 |